July 4, 1950
R. M. LAUGHLIN
GUIDE AND SUPPORTING MEANS
FOR PORTABLE POWER SAWS
2,513,497
Filed March 9, 1948
3 Sheets-Sheet 2
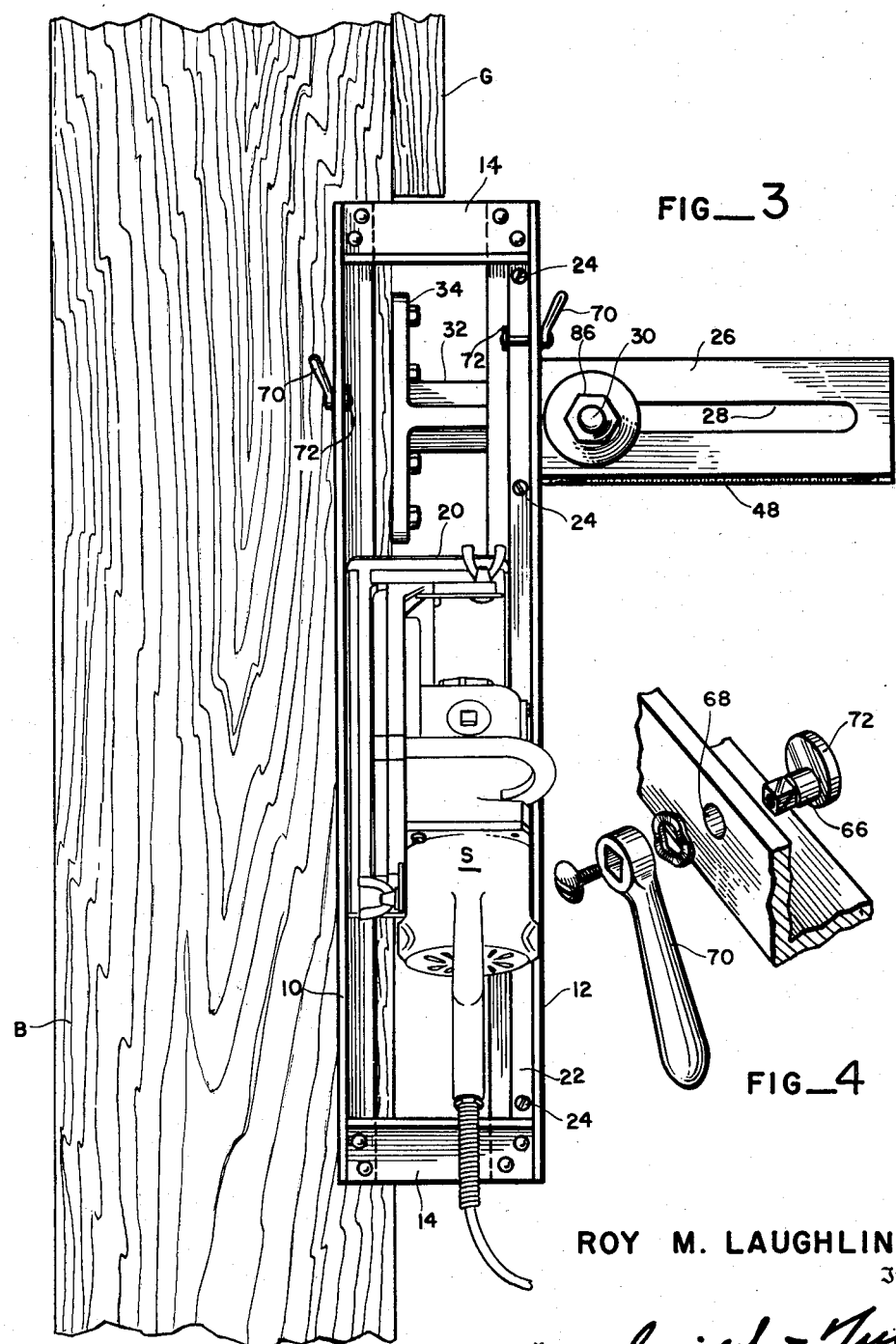
ROY M. LAUGHLIN
Inventor
By Smith & Tuck
Attorneys July 4, 1950
R. M. LAUGHLIN
GUIDE AND SUPPORTING MEANS
FOR PORTABLE POWER SAWS
2,513,497
Filed March 9, 1948
3 Sheets-Sheet 3
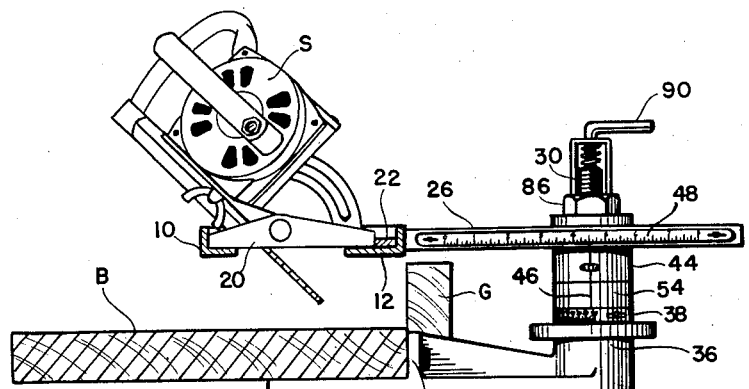
FIG_5
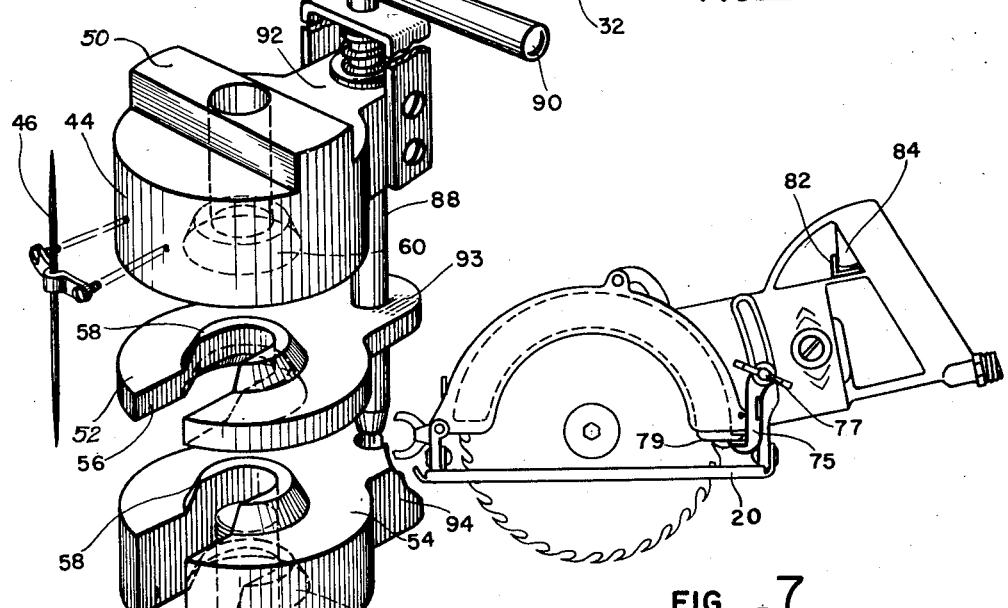
FIG_7
FIG_6
ROY M. LAUGHLIN
Inventor
By Smith & Tuck
Attorneys Patented July 4, 1950

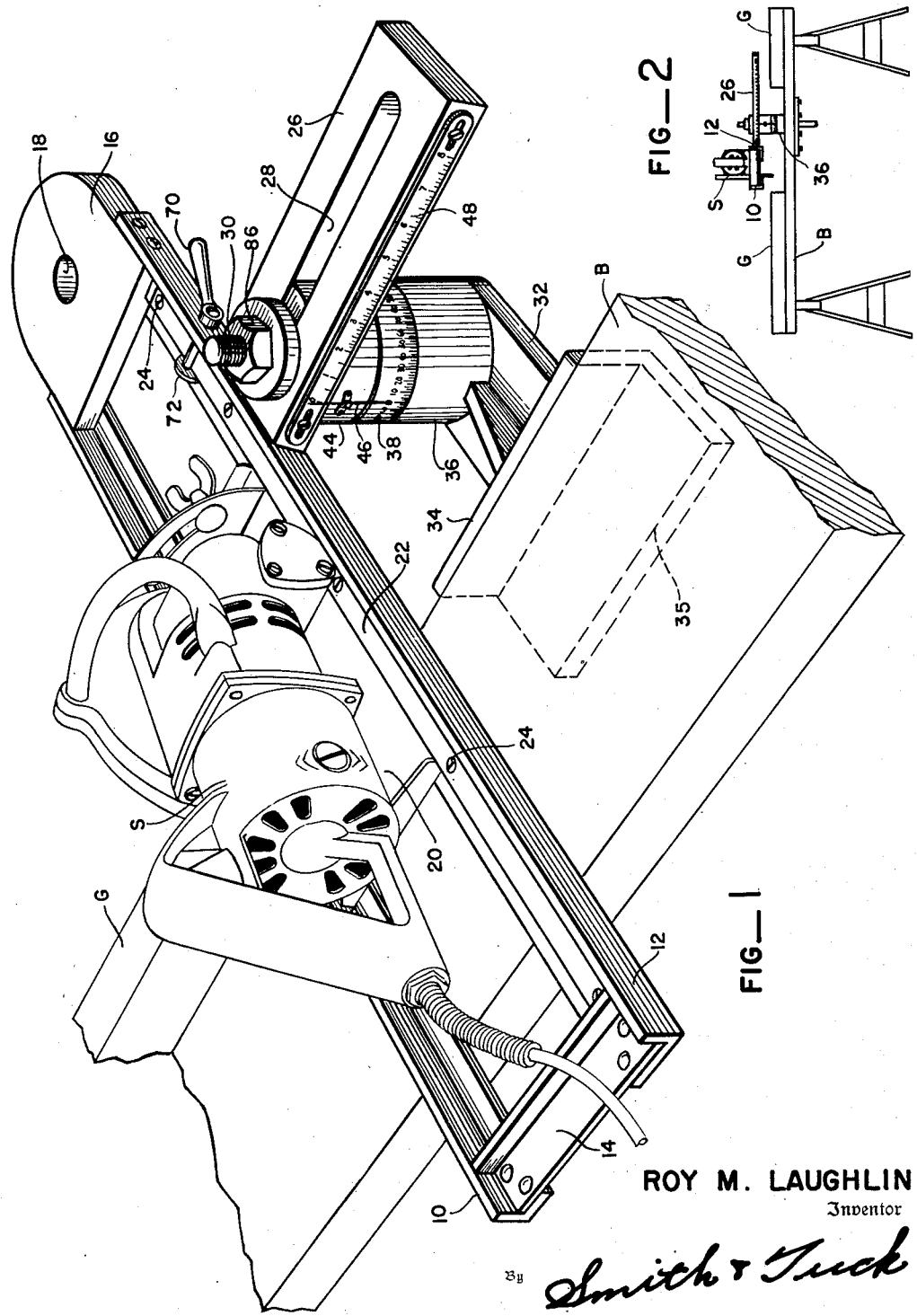

2,513,497

UNITED STATES PATENT OFFICE 2,513,497

GUIDE AND SUPPORTING MEANS FOR PORTABLE POWER SAWS

Roy M. Laughlin, Seattle, Wash.

Application March 9, 1948, Serial No. 13,748

7 Claims. (Cl. 143—6)

My present invention relates to the general art of portable power-driven circular saws and more particularly to guide and supporting means for portable power saws.

In order to extend mechanization to the building trades there has come into recent general use a number of portable power-driven circular saws. Through the use of this equipment a great saving is made in the time required by carpenters, and the like, in many forms of building work. Normally such power saws are provided with an electric motor, which through suitable gearing turns a circular saw at the optimum cutting speed. Such saws are provided with a rest, or platform, upon which the saw rests upon the work and upon which the saw is moved as the cut progresses. The saws also are usually provided with slotted quadrants and clamping means so that the saw can be tilted with respect to this platform. Further it has been found desirable to provide automatically operating guards for the saw blade in order to overcome a very constant source of danger to the users of the equipment. For rough work that is going to be covered by finish it is normal to use the saws without any guiding means. However, it has been found that when guiding means can be effectively employed, accuracy can be greatly increased, and an appreciable saving can be made in time, and as saws are primarily intended to save time, any accessories that will augment this saving are of real worth to the building trade industry.

There have also been supplied to the building trades various forms of guided saws operating on either round or flat guide means so that cut-off operations or ripping operations can be achieved. These tools, however, are large bulky tools, to which the work must be carried and taken away from, and their very nature precludes the use of the cutting tool for portable work.

In supplying my guide and support for power saws I provide a unit which in itself is readily portable and which can be attached to any form of table or work bench or to a plank which may be supported by horses or some convenient means. The portable saw can be used in my guideway for the various duplicated cuts which occur so frequently in building work. The user, however may still have his saw readily available for other use by merely lifting it out of the guideway and carrying it to the point of other work. In this manner a workman may easily transport his saw equipment and with it have the maximum use of his power driven tool.

The principal object of my present invention therefor is to provide a guide and supporting means for power tools that will greatly increase their usefulness without in any way detracting from their normal use.

A further object of my present invention is to provide a guide and supporting means for power saws that can be easily transported, as it has no greater bulk or weight than the saw itself, and is a separate unit which does not have to be carried with the power saw.

A further object of my present invention is to provide a guide and supporting means for power saws which will enable an operator, from a single positioning of the mounting socket, to achieve cut-off operations at right angles to the length of the boards, or to rip the same, or to cut any angles intermediate these two extremes.

A further object of my invention is to provide means whereby a portable saw may be guided while making angle cuts with the surface of the board without regard to the angle at which the saw may be operating with respect to the length of the board.

A further object of my invention is to provide means for adapting a portable saw to all the various major cuts that it may be desired to make.

A further object of my invention is to provide convenient means for accurately positioning my guide means above the working surface to which it is attached, so that cuts of various depths can be achieved.

A further object of my invention is to provide means for quickly clamping a portable saw in my guide ways without any attachments to the saw itself.

A further object of my invention is to provide means in the form of attachments for holding any automatic saw guards out of the zone of saw operation while the saw is in my guideway.

A further object of my invention is to provide means for the convenient adaptation of a portable saw to ripping and allied operations.

Further objects, advantages and capabilities will be apparent from the description and disclosure in the drawings or may be comprehended or are inherent in the device.

In the drawings:

Fig. 1 is a perspective view showing my portable saw guideway and support means as positioned for making cut-off cuts.

Fig. 2 is an end view of Fig. 1, on a substantially reduced scale, illustrating the simple means for mounting my positioning bracket.

Fig. 3 is a top plan view of a power saw positioned in my guideway and the same is shown in the position suitable for ripping boards.

Fig. 4 is an exploded perspective view showing the clamping means I employ to hold the portable saw in my guideway while making long ripping cuts.

Fig. 5 is a cross sectional view through the table to which my guideway is secured, showing certain parts in section, and showing the saw in the position suitable for making bevelled ripping cuts.

Fig. 6 is an exploded perspective view showing the means employed for indexing my mount and for making height adjustments.

Fig. 7 is a side view of a typical power saw of the electrical driven type showing the saw guide platform, means for retaining the saw guard in inoperative position, and means for holding the electric switch in its closed position as for ripping.

Referring to the drawings, throughout which like reference characters indicate like parts, my guide and support means consists essentially of a guideway adapted to receive a portable power saw and permit it to be moved longitudinally thereof, and having supporting means therefor, so that the guide can be adjusted in its angular relationship to the base on which it is secured and to its height above that base.

The guideway proper of my device may be formed either as a casting, or preferably fabricated from structural shapes. The latter has the advantage in that it can normally be made lighter and more resistant to damage as might occur in the rough handling to which such equipment is sometimes subjected. The details of structure will probably be best understood by reference to Figs. 1, 4 and 5, in which two structural angles as 10 and 12 are disposed in spaced parallel relationship, as by means of the end fittings 14 or, as shown in Fig. 1, a fitting 14 is used at one end, and a block fitting 16 at its opposite end. Block fitting 16 is provided with a centrally disposed through-hole 18 which is adapted to uses which will be explained later.

As will be observed in Figs. 1 and 5, the angles 10 and 12 are so disposed that their horizontal legs form a rest for the base 20 of saw S. Guiding of the saw might be achieved by the vertical legs of angles 10 and 12. However, in order to adapt my device to saws of different manufacture I prefer that one angle as 10, have its vertical leg used as one of the guide members, and that the other or opposing guide member be provided by an inserted, but detachable, bar 22. This bar 22, which is held in position by a plurality of screws 24, is easy to replace with one of a different width so that bases 20 of different widths can readily be accommodated in the same guideway frame. It is recommended that angle 12 be of an unequal angle arrangement, so that the horizontal leg will have greater extent than the vertical leg, after the showing of Figs. 1 and 5. It will be apparent it is believed that such an insert member would be particularly desirable if the entire guideway were to be formed as a casting. In this connection, the fabricated members have been found normally to be sufficiently accurate for all practical purposes and therefore no machining of the guideway surfaces is required as is usually most necessary if a casting is employed.

Fixedly secured to the main guide frame assembly or formed as part of the same, if a casting is employed, is an outstanding leg 26. This leg is preferably at right angles to the guideway and is slotted at 28 throughout the greater portion of its length so as to slidably accommodate the pivot and locking bolt 30. The length of slot 28 will normally depend upon the adjustment desired when the saw is swung around into its ripping position.

Bolt 30 is normally fixedly secured to the supporting bracket 32. This bracket is provided with an angle rest portion having the vertical leg 34 and the horizontal leg 35 which are adapted to be secured to a bench B as by lag screws or some similar securing means. At its opposite end bracket 32 is provided with a round boss 36 which is normally drilled and tapped at its center to accommodate bolt or stud 30.

About the top of boss 36, as is probably best illustrated in Fig. 6, is provided an indexing scale 38 which is normally secured in place by a plurality of screws 40 which pass through slots 42, and thus a limited degree of zeroing is possible with scale 38. Adapted to be disposed on bolt 30 above boss 36 is the guideway engaging spacer 44. This spacer I prefer normally to form of the same outside diameter as boss 36 and to provide it with an index 46 which is best shown in Fig. 6, in its exploded position. It is also shown on reduced scale in Figs. 1 and 5. This indexer is provided with an upper and lower extension, so as to be usable with scale 38, or with a second scale 48, which is formed on the vertical face of arm 26. Spacer 44 is provided with a key member 50, of a size adapted to fit snugly in slot 28, and to always maintain the index 46 in proper relationship to arm 26 so that it will be accurate. Disposed intermediate spacer 44 and boss 36, may be a number of spacer elements of varying thickness as 52 and 54. These spacer elements are used to change the vertical position of my guideways with respect to the work bench, and I have provided that they be easy to insert or remove, and have formed them somewhat after the shape of weights used on a platform scale, so that they have a central hole with a slot 56, which is sufficiently wide to pass over bolt 30. I have further provided central cones 58 which are adapted to seat within female conical recesses 60 formed in each of the spacers.

It is to be noted in Figs. 1 and 5 that I have illustrated a scale 48 which is capable of a small amount of longitudinal adjustment so that it may be accurately zeroed. This scale is used in conjunction with index 46 and may be used to increase or decrease the length of a cut when material is slid along a bench B up against a stop and it is desired to make an adjustment of a few inches in length. With this arrangement changes in length can be effected in a cut without any physical change in the fixed stop on the bench. The principal object of this scale, however, is for use when the guiding means is revolved to the position shown in Fig. 3 in which the saw is mounted fixedly in the guideway for passing material under the saw, or where the ripping operation may only be for a short distance, in which case the saw is moved in the guideway to accommodate the relatively short ripping cut. Under such conditions, it will be apparent it is believed that the thickness of the piece to be ripped can be accurately determined, and changes conveniently made by use of scale 48 and its associated index 46. It is to be noted however, that scale 48 in order to be operable with index 46 must be placed on the edge of arm 26 in a position where it is tangent to the circle of spacer 44.

Bench B may be made in any convenient manner, keeping in mind the work to be done. It may be, for instance in its simplest form, formed as a plank mounted on horses, as illustrated in Fig. 2. Usually a back wall or guide G is provided.

In order to most fully adapt a power saw to useful work through the means of my guide and supporting device, certain accessories have been indicated as desirable. In Fig. 4, I have illustrated in detail a clamping arrangement which I have found to be very useful in holding the power saw in place if long ripping is to be done and it is desired to slide the material under the fixed saw. This clamping arrangement, which is shown in duplicate in Fig. 3, with one unit on each side of my guideway, consists essentially of a bolt 66, which is adapted to revolve as in hole 68, formed in the vertical leg of angles 10 and 12. One end of bolt 66 is threaded, or otherwise configured, to engage a handle 70 in a manner that will make it possible to revolve the bolt by revolving the handle. The other end of bolt 66 is provided with a cam or eccentric member 72. In normal use, I have found the eccentric is the most convenient to use. However, any suitable cam profile could be made to serve the purpose. When it is desired to clamp the power tool in place, it is slipped forward of the position shown in Fig. 4 until cam members 72 are above the opposite sides of platform 20. Then, by revolving handles 70, the tool is clamped fixedly to the guideway in such a manner that the tendency of the saw to raise the tool out of the saw kerf is opposed, and continuous ripping may be achieved.

In order to provide convenient means for quickly adjusting my guideway for the most common framing cuts, I employ a retractable stop pin or rod 88, Fig. 6. This rod may have any desired shape of handle as 90. Lugs, which form guides, are provided as part of spacers 44—52 and 54; these are indicated at 92, 93, and 94, respectively, and are provided with through openings which provide a neat fit for pin 88. Boss 36 is provided with an annular ring 96 in which is formed a plurality of openings 97. Openings 97 are positioned to provide definite stops for the guideway on all the usual cuts as 0°-30°-45°, etc., or the various rafter bevels may be used, for instance. It is desired to point out that when pin 88 passes through the various guide holes, it is in shear at all partings between the different spacers and the boss 36 so that it can resist a great deal of shock which might knock my guideway out of its intended position, thus introducing errors in the cuts that might not be detected until the cut pieces are put to use.

In Fig. 7, I have illustrated two elements which add materially to the workability of the unit, and may consist of a hook as 75, which is pivoted on the bolt 77, and is swung into position and clamped by the wing nut so as to hold the revolvable guard 79 up above the saw platform 20, and thus it does not interfere with the sequence of operation when the power tool is used with my guiding and supporting means.

Another accessory that adds materially to the convenience of using a tool in this manner is a form of pivoted latch 82 which may be of any convenient form, as long as it can selectively close the tool energizing switch 84, and hold it closed so that operator can leave the tool running as he passes material under the same, particularly in extended ripping operations.

*Method of operation*

In using my tool on construction work, for instance, the power tool itself normally is carried to the work in its fitted box which contains the tool and its necessary essential accessories. My guide and supporting means is about the same weight and bulk so it is conveniently portable. On arriving at the job, a table or bench B is constructed. As indicated, in its simplest form it might be as shown in Fig. 2, merely a plank or board B with a guide member G secured thereto and supported in some convenient manner. Bracket 32 is then secured to this plank, or bench, by means of lag screws passing through the angle legs 34 and 35.

The next operation is to determine what spacers are required under the tool to bring it up to the height suitable for use with the material that it is contemplated to cut. The tool is then assembled as shown in Fig. 1 or Fig. 3. In some instances it may be desirable to merely pass bolt 30 through hole 18, and to then tighten slightly nut 86, so that the whole guideway can be rocked about bolt 30.

In the most common cut-off operation, the saw is retracted to the end of the guideway, furthest removed from pivot 30. Material is placed under the saw, usually against a length-determining stop and the cut is made by pushing the saw along the guide-way.

Ripping is performed by revolving the guideway so that its axis is parallel to the intended cut, as in Fig. 3. The saw platform is gripped by means of eccentrics 72 which are best mounted as near as possible to pivot 30. The switch is then locked in the closed position and materials are then fed under the stationary saw. Angle cuts are made in the same general manner as cut-offs, with the angle set by swinging the guideway around pivot 30 until index 46 shows the desired angle or scale 38.

It is believed that it will be clearly apparent from the above description and the disclosure in the drawings that the invention comprehends a novel construction of guide and supporting means for portable power saws.

Having thus disclosed the invention, I claim:

1. A guide and supporting means for portable power saws, consisting of: a guideway having horizontal bearing surfaces disposed in parallel spaced relationship; vertical guideways disposed in juxtaposition to said bearing surfaces; end fittings adapted to secure said guideways in fixed parallel relationship and form limit stops for a power saw; an outstanding leg secured to said guideway and lying in the same horizontal plane; said leg having a longitudinal slot extending vertically through said leg; a supporting bracket adapted to be secured to a work surface at one end and having a bearing boss at the other end; a pivot bolt secured to said boss, extending vertically therefrom and adapted to coact with said slot to position said guideway; spacer adjusting means disposed between said boss and said outstanding leg; clamping means adapted to secure said leg and said boss in adjusted position; an upper spacer having a key member adapted to engage said slot; an index secured to said upper spacer and adapted to overlap said leg and said bearing boss.

2. A guide and supporting means for portable power saws, consisting of: a guideway having horizontal bearing surfaces disposed in parallel spaced relationship; vertical guideways disposed in juxtaposition to said bearing surfaces; end fittings adapted to secure said guideways in fixed parallel relationship and form limit stops for a power saw; an outstanding leg secured to said guideway and lying in the same horizontal plane; said leg having a longitudinal slot extending vertically through said leg; a supporting bracket adapted to be secured to a work surface at one end and having a bearing boss at the other end; a pivot bolt secured to said boss, extending vertically therefrom and adapted to coact with said slot to position said guideway; vertical adjusting means disposed between said boss and said outstanding leg; means adapted to secure said leg and said boss in relative adjusted position; an upper spacer having a key member adapted to engage said slot; an index secured to said upper spacer and adapted to overlap said leg and said bearing boss.

3. A guide and supporting means for portable power saws, consisting of: a guideway having horizontal bearing surfaces disposed in parallel spaced relationship; vertical guideways disposed in juxtaposition to said bearing surfaces; end fittings adapted to secure said guideways in fixed parallel relationship and form limit stops for a power saw; an outstanding leg secured to said guideway and lying in the same horizontal plane; said leg having a longitudinal slot extending vertically through said leg; a supporting bracket adapted to be secured to a work surface at one end and having a bearing boss at the other end; a pivot bolt secured to said boss, extending vertically therefrom and adapted to coact with said slot to position said guideway; vertical adjusting means disposed between said boss and said outstanding leg; clamping means on said guideway adapted to secure a power saw in adjusted position; an upper spacer having a key member adapted to engage said slot; an index secured to said upper spacer and adapted to overlap said leg end and said bearing boss.

4. A guide and supporting means for portable power saws, consisting of: a guideway having horizontal bearing surfaces disposed in parallel spaced relationship; vertical guideways disposed in juxtaposition to said bearing surfaces; end fittings adapted to secure said guideways in fixed parallel relationship and form limit stops for a power saw; an outstanding leg secured to said guideway and lying in the same horizontal plane; said leg having a longitudinal slot extending vertically through said leg; a supporting bracket adapted to be secured to a work surface at one end and having a bearing boss at the other end; a pivot bolt secured to said boss, extending vertically therefrom and adapted to coact with said slot to position said guideway; spacer adjusting means disposed between said boss and said outstanding leg; and clamping means adapted to secure said leg and said boss in adjusted position.

5. A guide and supporting means for portable power saws, consisting of: a tool guideway having spaced side members, disposed in parallel relationship, adapted to guide and support a power saw as it is moved longitudinally thereof; a leg, secured to said guideway, substantially normal thereto and lying in the same horizontal plane as said guideway; said leg having a longitudinal slot vertically through and extending for the major portion of length of said leg, intermediate its ends; a supporting bracket adapted at one end to be secured to a work surface and having a bearing boss at the opposite end having an upper surface parallel to the plane of said guideway; a bolt secured to said boss and disposed vertically above said boss and adapted to slidably engage said slot; an engaging spacer disposed on said bolt between said leg and said boss having means to prevent angular movement between said spacer and said leg; and clamping means associated with said bolt to secure said leg in fixed angular relationship with said boss.

6. A guide and supporting means for portable power saws, consisting of: a tool guideway having spaced side members, disposed in parallel relationship, adapted to guide and support a power saw as it is moved longitudinally thereof; said side members having a horizontal bearing surface and a vertical guideway surface; a leg, secured to said guideway, substantially normal thereto and lying in the same horizontal plane as said guideway; said leg having a longitudinal slot vertically through and extending for the major portion of length of said leg, intermediate its ends; a supporting bracket adapted at one end to be secured to a work surface and having a boss at the opposite end; said boss having clamp means adapted to operatively engage said guideway and secure it in adjusted horizontal position.

7. A guide and supporting means for portable power saws, consisting of: a tool guideway having spaced side members, disposed in parallel relationship, adapted to guide and support a power saw as it is moved longitudinally thereof; a leg, secured to said guideway, substantially normal thereto and lying in the same horizontal plane as said guideway; said leg having a longitudinal slot vertically through and extending for the major portion of length of said leg, intermediate its ends; a supporting bracket adapted at one end to be secured to a work surface and having a boss at the opposite end having an upper surface parallel to the plane of said guideway; a bolt secured to said boss and disposed vertically above said boss and adapted to slidably engage said slot; an engaging spacer disposed on said bolt between said leg and said boss and means to prevent relative angular movement between said spacer and said leg; U-shaped spacer means adapted to adjustably space said boss and said leg and means for positioning said spacer means co-axially with said bolt and a clamping nut for said bolt.

ROY M. LAUGHLIN.

REFERENCES CITED

The following references are of record in the file of this patent:

UNITED STATES PATENTS

| Number | Name | Date |
|---|---|---|
| 1,248,471 | Foster | Dec. 4, 1917 |
| 1,457,492 | Bloodgood | June 5, 1923 |
| 1,832,283 | Earhart | Nov. 17, 1931 |
| 1,836,457 | Emmons | Dec. 15, 1931 |
| 1,846,641 | Hedgpeth | Feb. 23, 1932 |
| 2,306,512 | Whitney | Dec. 29, 1942 |
| 2,455,097 | Scianna | Nov. 30, 1948 |